United States Patent
Press et al.

(10) Patent No.: US 6,189,519 B1
(45) Date of Patent: Feb. 20, 2001

(54) SHORT STROKE SOLENOID ACTUATED EGR VALVE

(75) Inventors: Roman Joseph Press, Pittsford; Kenneth John Dauer, Avon, both of NY (US)

(73) Assignee: Delphi Technologies, Inc., Troy, MI (US)

(*) Notice: Under 35 U.S.C. 154(b), the term of this patent shall be extended for 0 days.

(21) Appl. No.: 09/379,288

(22) Filed: Aug. 23, 1999

(51) Int. Cl.[7] .............................. F02M 25/07; F16K 31/02
(52) U.S. Cl. ................................ 123/568.26; 251/129.15; 123/568.21
(58) Field of Search .......................... 123/568.11, 568.21, 123/568.26; 251/129.09, 129.15

(56) References Cited

U.S. PATENT DOCUMENTS 5,460,146 * 10/1995 Frankenberg .................... 123/568.21

\* cited by examiner

*Primary Examiner*—Tony M. Argenbright
*Assistant Examiner*—Arnold Castro
(74) *Attorney, Agent, or Firm*—John A. VanOphem

(57) ABSTRACT

A simplified EGR valve for automotive engines is actuated by compact single or dual solenoids having a short stroke. The short stroke is made possible by one or more annular orifices in a preferably flat valve seat or valve plate, the orifices being fed from both radially inner and outer sides upon opening movement of the valve plate a short distance away from the valve seat. The use of annular orifices allows a relatively large gas flow through the valve with a short stroke or movement of the valve plate. This permits the use of a solenoid or solenoids of relatively low power and mass. The valve may be operated by pulse width modulation of an electrical signal controlled by the vehicle ECM to vary the percentage of open time of the valve in order to vary EGR flow in a known manner. Thus, the need for a valve position sensor and feedback control is avoided which, together with reduced actuator mass and volume, provides a substantially reduced cost and operating complexity for the system. The valve assembly, including a valve plate, a pintle shaft and an attached solenoid armature, may be made very light so that response time to opening and closing commands is rapid and the use of relatively low power solenoid actuation is enhanced.

15 Claims, 5 Drawing Sheets

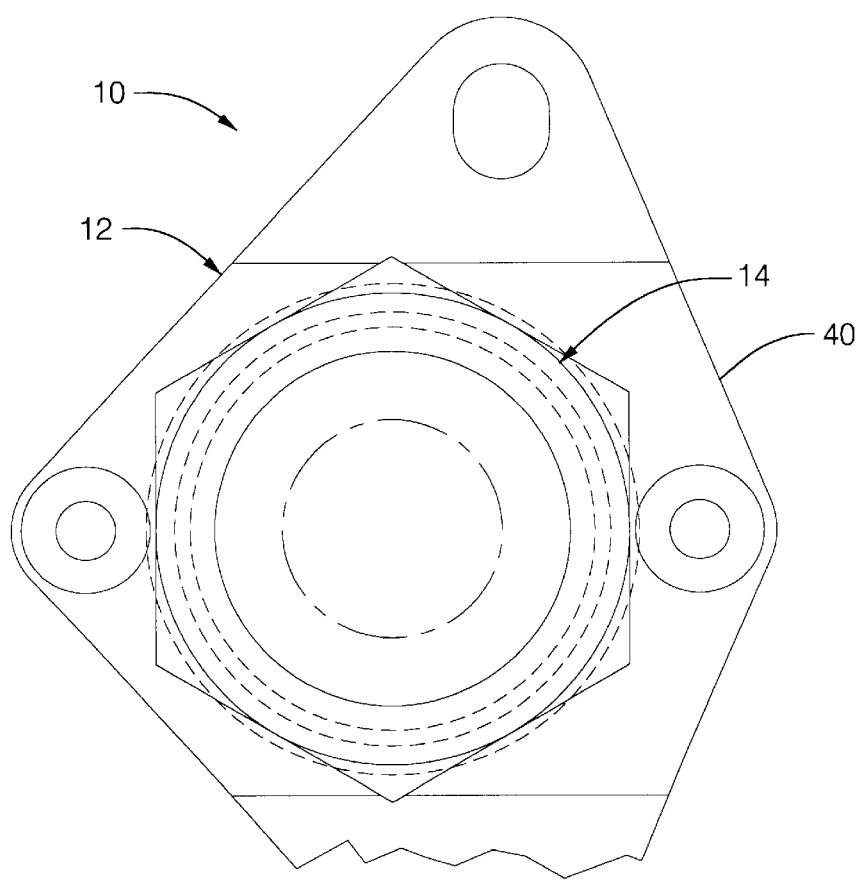
FIG. 2
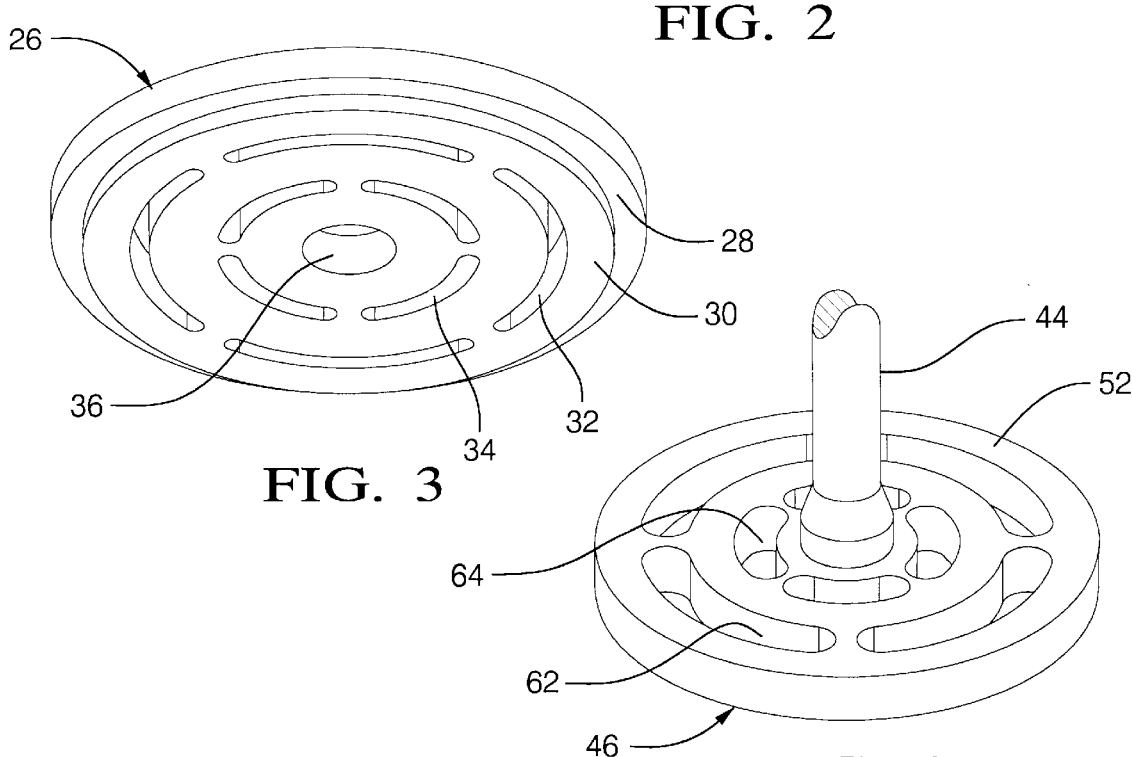
FIG. 3
FIG. 4

SHORT STROKE SOLENOID ACTUATED EGR VALVE

TECHNICAL FIELD

This invention relates to exhaust gas recirculation (EGR) valves for automotive engines, and more particularly, to a short stroke solenoid actuated EGR valve designed to be controlled by variable frequency pulse width modulation by an open loop control.

BACKGROUND OF THE INVENTION

It is known in modern emissions controlled automotive engines to place the metering of exhaust gas recirculation (EGR) under the control of an engine management computer. This has often been accomplished in an analog manner using an axially movable pintle valve. A linear solenoid, energized by the computer, withdraws the valve from the seat while position feedback is provided by a resistive potentiometer. The flow of recirculated exhaust gas is a function of the position of the valve above its seat.

While these systems have performed well in numerous applications, they have a number of disadvantages which are inherent to the concept. One disadvantage is that a sensor must be provided to indicate the valve position to the electrical control module (ECM). Also, a sophisticated closed-loop control algorithm is required to maintain a desired valve position. Both of these introduce undesired cost and complexity into the system.

A second factor is that the valve utilized is generally a more or less conical pintle operating in a circular seat. To expose lateral area equivalent to that of the circular hole, the stroke of the valve must be about half the hole radius, as much as a few millimeters in an automotive EGR valve. Since the size and mass of the linear solenoid is a direct function of the required stroke, the solenoid for this type of EGR valve tends to be quite bulky and massive. If a particularly large amount of EGR flow is needed, the solenoid may become unacceptably large.

Other types of EGR valves which have been proposed also involve additional materials, complications or control problems that may add to their cost or operability.

SUMMARY OF THE INVENTION

The present invention provides a simplified EGR valve actuated by compact single or dual solenoids having a short stroke. The short stroke is made possible by one or more annular orifices in a preferably flat valve seat or valve plate. The orifices are fed from both radially inner and outer sides upon opening movement of the valve plate a short distance away from the valve seat.

The use of annular orifices allows a relatively large gas flow through the valve with a short stroke or movement of the valve plate. This also permits use of a solenoid or solenoids of relatively low power and mass. The valve may be operated by pulse width modulation (PWM) of an electrical signal controlled by the vehicle ECM to vary the percentage of open time of the valve in order the vary EGR flow in a known manner. Thus, the need for a valve position sensor and feedback control is avoided which, together with reduced actuator mass and volume, provides a substantially reduced cost and operating complexity for the system.

The valve assembly, including a valve plate, a pintle shaft and an attached solenoid armature, may be made very light so that response time to opening and closing commands is rapid and the use of relatively low power solenoid actuation is enhanced.

These and other features and advantages of the invention will be more fully understood from the following description of certain specific embodiments of the invention taken together with the accompanying drawings.

BRIEF DESCRIPTION OF THE DRAWINGS

In the drawings:

FIG. 2 is a top view of the valve of FIG. 1;

FIG. 3 is a pictorial view showing the lower side of a circular valve seat for the valve of FIGS. 1 and 2;

FIG. 4 is a pictorial view showing the upper side of a valve plate for the valve of FIGS. 1 and 2;

DESCRIPTION OF THE PREFERRED EMBODIMENT

Figure 1:
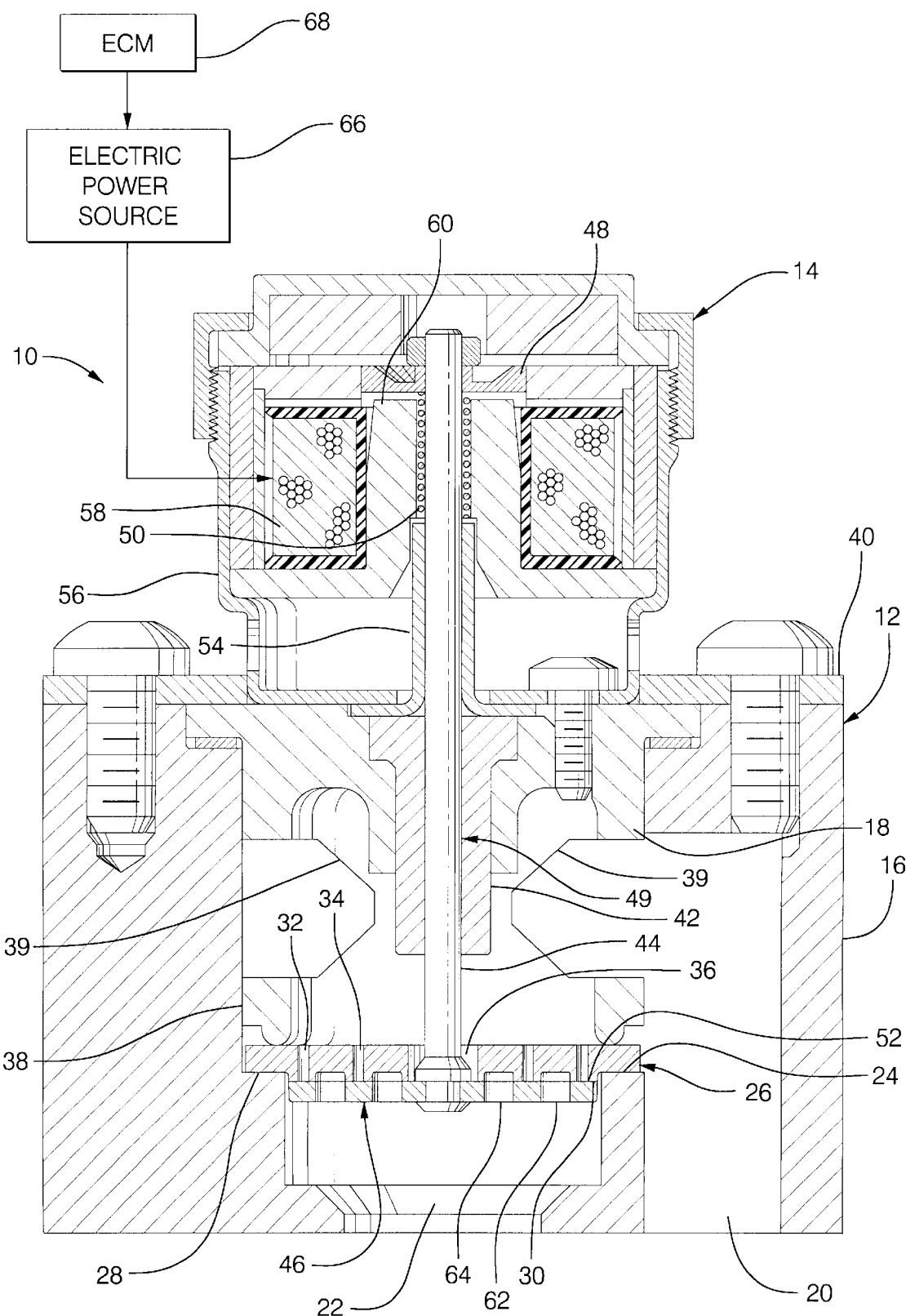
FIG. 1 is an axial cross-sectional view of a preferred embodiment of EGR valve according to the invention.
Figure 5:
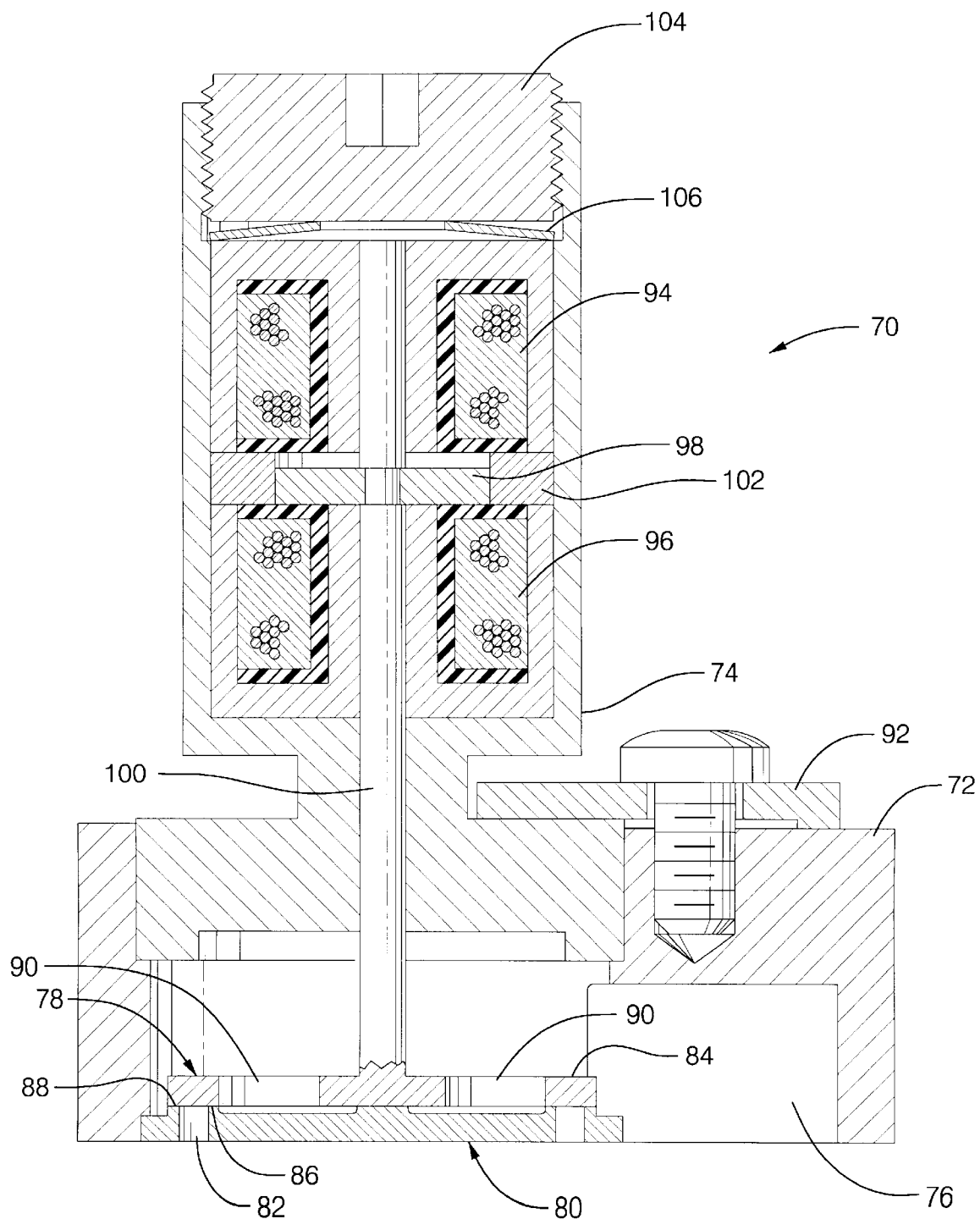
FIG. 5 is an axial cross-sectional view of an alternative embodiment of EGR valve according to the invention.
Figure 6:
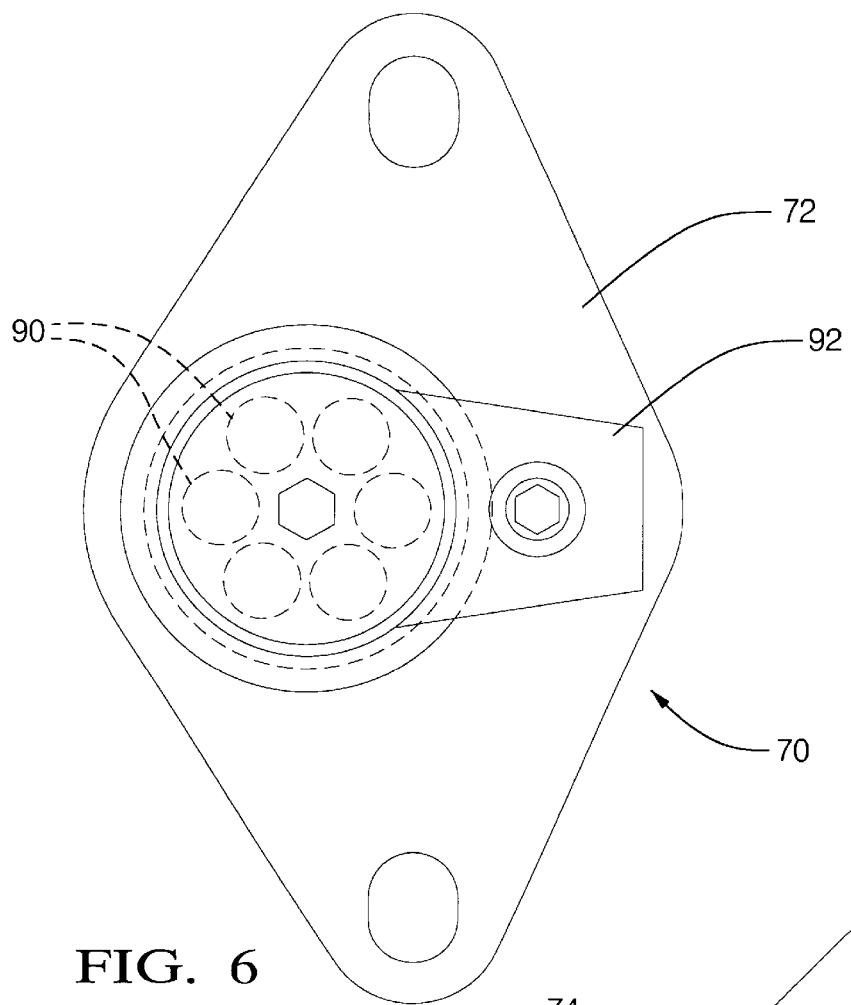
FIG. 6 is a top view of the valve of FIG. 5.

Referring first to FIGS. 1–4 of the drawings in detail, numeral 10 generally indicates a short stroke solenoid actuated EGR valve according to the invention. EGR valve 10 includes as major elements a valve body 12 and a solenoid actuator 14 seated on the valve body.

In this embodiment, the valve body 12 includes a base 16 and a pintle housing 18 which together define first and second passages 20, 22, respectively, either of which could be an inlet passage and the other of which would be an outlet passage for the flow of recirculated exhaust gases.

Between the passages 20, 22, the base 16 includes an annular abutment 24 on which is mounted or disposed a valve seat 26, also shown in FIG. 3. The valve seat is of a disk shape but has a partially recessed edge portion 28 that seats upon the abutment 24. A downwardly extending central portion has a flat downwardly facing seat surface 30 and assists in centering the valve seat 26 within the second passage 22. In order to pass recirculated exhaust gas, the valve seat includes a pair of radially spaced outer and inner annular orifices 32, 34, as well as a central opening 36 to be subsequently further discussed. The annular orifices are formed as a series of arcuate slots interrupted by bridge structure required to retain the inner and outer portions of the valve seat together. Thus, the term "annular orifice" as used in the specification and claims is intended to include not only complete unbroken rings or annuli but also interrupted rings of the sort utilized in the present embodiment.

The valve seat 26 is retained in place by a tubular lower end 38 of the pintle housing 18 which is retained in a mounting opening in the base by a mounting ring or clamp 40. End 38 of the housing includes side openings 39 through which the first inlet or outlet passage 20 communicates with the valve seat 26. Housing 18 also carries a central guide bushing 42 which reciprocably mounts a pintle shaft 44. The pintle shaft 44 carries on its lower end a valve plate 46 and on its upper end a solenoid armature 48, forming a valve assembly 49 to be subsequently further discussed.

The pintle housing 18 also mounts the solenoid actuator 14 in which the armature 48 is disposed. A return spring 50 urges the armature upward, biasing a flat upper plate surface 52 of the valve plate 46 against the lower seat surface 30 of the valve seat 26 so as to cut off flow through the orifices 32, 34 and central opening 36 and close the valve. The spring 50 is seated on the upper end of a seal bushing 54 which extends around the pintle shaft 44 and out of the housing 56 of the solenoid actuator 14 to seat by a flange in a recess of the pintle housing 18. A magnetic coil 58 within the actuator 14 is operative when energized to create a magnetic field that draws the armature 48 downward against the upper end of an inner magnetic core 60, moving the valve assembly 49 of the pintle shaft 44, valve plate 46 and armature 48 downward through a relatively short stroke.

The valve plate 46 is secured by suitable means to a lower end of the pintle shaft 44 which extends through the central opening 36 of the valve seat 26 and supports the valve plate 46 immediately below the valve seat 26. Valve plate 46, also shown in FIG. 4, is preferably a disk having concentric outer and inner annular slots or orifices 62, 64. Also, the outer periphery of the valve plate 46 is spaced from the adjacent inner wall or surface of the second passage 22 so that a peripheral passage is formed between the valve plate 46 and passage 22.

The valve is opened by downward motion of the valve assembly 49 upon energizing of the solenoid coil by an electric power source 66. The armature 48 is drawn downward causing the valve plate 46 to move a short distance, or stroke, away from the valve seat 26. This allows exhaust gas to flow in either direction through the valve plate slots or orifices 62, 64 and around the periphery of the valve plate 46 as well as radially through the clearance formed between the valve plate 46 and valve seat 26. *Opening the valve also allows exhaust gas to pass through the valve seat orifices 32, 34 and the outer portion of the central opening 36 through which the valve pintle extends and which forms a third annular orifice. In this way, gas flow passing through one set of annular orifices moves radially inward and outward to enter the adjacent orifices of the other component, whether it be the valve seat or valve plate, and provides a maximum flow of gas through the valve with a relatively small movement or stroke of the valve assembly.

When maximum exhaust gas flow is required, the magnetic coil 58 is continuously energized, allowing gas to flow continuously through the open valve at the maximum rate. However, in operating conditions where a varying or smaller flow of gas is desired, as determined by an engine electronic control module (ECM), the ECM opens and closes the valve sequentially with a variable timing or frequency through pulse width modulation (PWM). This varies the opening time of the valve relative to closed time and thus varies the amount of gas flow from the maximum available through an infinite range down to zero when the valve is closed all the time.

The response of the valve to opening and closing commands is very rapid because of the low mass of the valve assembly 49 and the short stroke required to fully open the valve, both of which combine to allow a relatively small solenoid to actuate the valve quickly in response to pulse width modulation over a wide frequency range. This advantage is provided by the use of the annular orifices in the valve seat and plate which allow maximum flow with a very short stroke as well as by the low mass of the valve assembly which is a function not only of size but of the mass of the materials used. Any suitable materials may be selected which are capable of operating in the environment and preferably provide the desired low mass to the total assembly.

In the construction of an EGR valve 10, as just described, it should be noted that the base 16 may be a separate member, as shown, or could equally well be part of a separate element, such as an exhaust or intake manifold or other engine component. In such a case, the pintle housing 18 is directly mounted to the associated engine component in which the inlet and outlet passages are located and which connect with the side openings 39 in the pintle housing that communicate the passage 20 with the valve seat 26. Other arrangements of the components could, of course, be provided as desired.

Referring now to FIGS. 5–9, numeral 70 generally indicates an alternative embodiment of short stroke solenoid actuated EGR valve according to the invention. Valve 70 also includes a base 72 and a housing 74, but the housing 74 serves as both a pintle housing and a coil housing. An inlet or outlet passage 76 is formed in the base 72 and extends to a valve plate 78 seated, when closed, on top of a valve seat 80. Seat 80 is received in a recess formed in the bottom of the base 72 and has a lower surface flush with the bottom of the base and partially defining a second inlet or outlet passage (not shown) when the valve 70 is installed on an engine.

Figure 7:
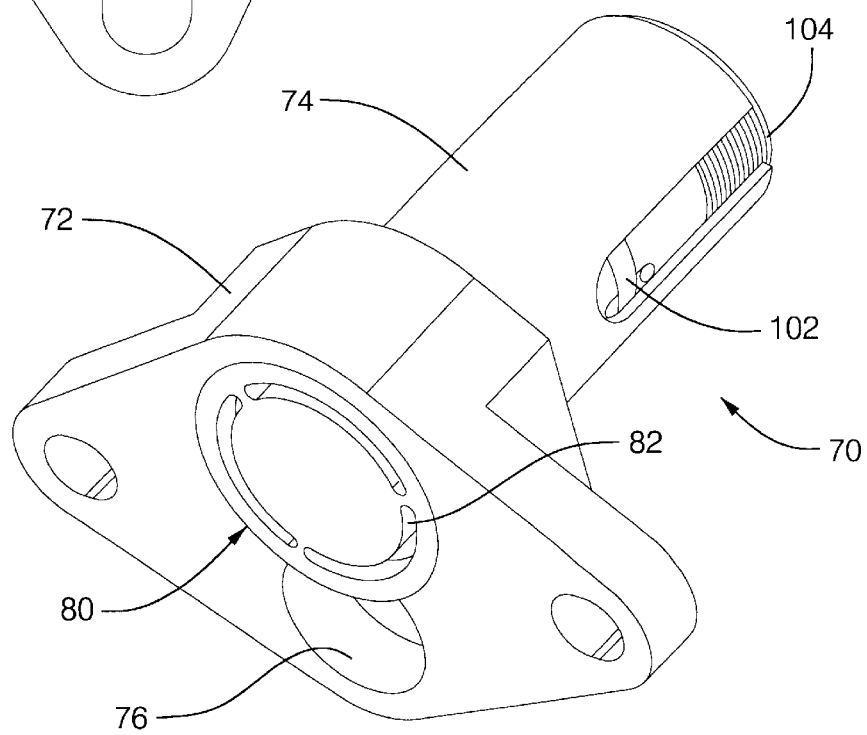
FIG. 7 is a lower pictorial view of the embodiment of FIGS. 5 and 6 showing the mounting section and valve seat with an annular orifice.
Figure 8:
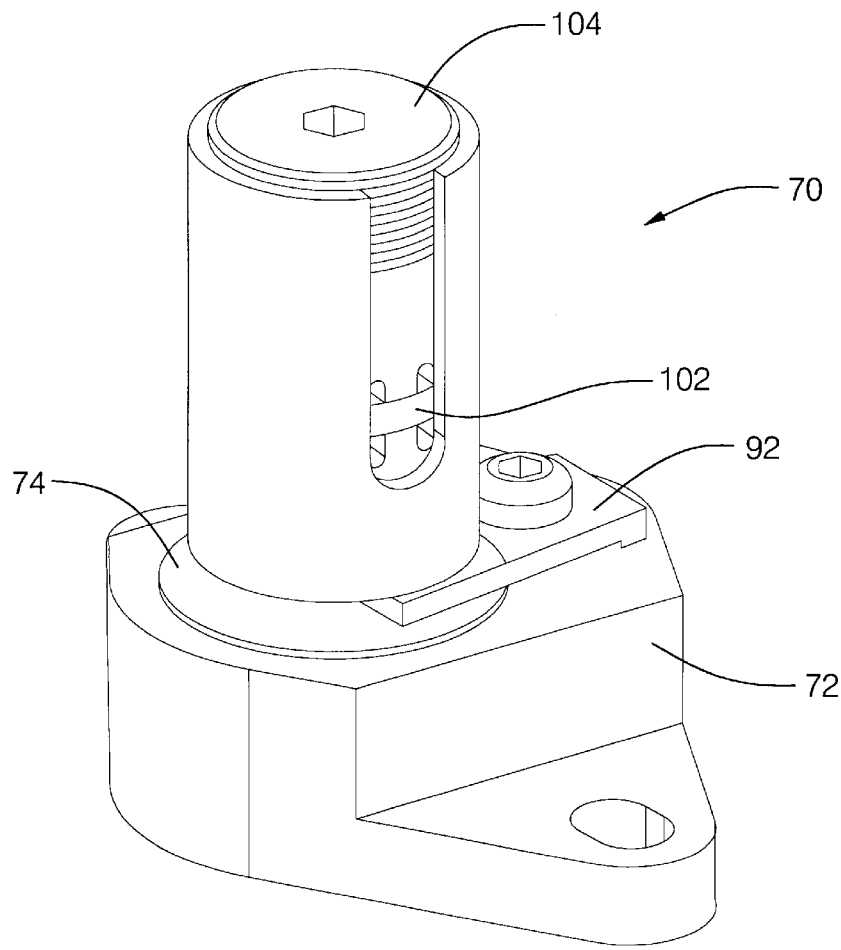
FIG. 8 is an upper pictorial view showing portions of the embodiment of FIGS. 5–7.
Figure 9:
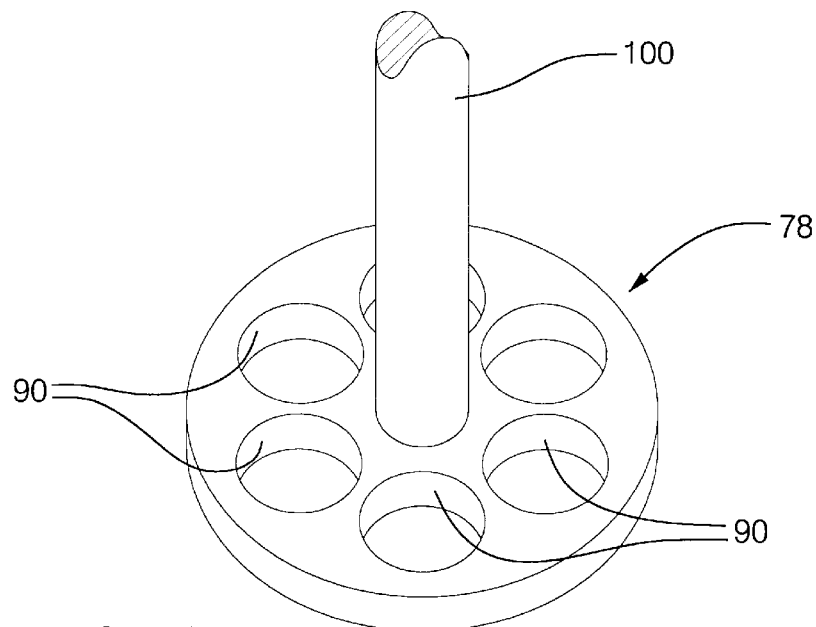
FIG. 9 is a pictorial view showing the valve plate and pintle shaft of the embodiment of FIGS. 5–8.

The valve seat 80 is formed with a single annular orifice 82 which, as seen in FIG. 7, is made up of a series of arcuate slots interrupted by connecting portions which retain the inner and outer portions of the valve seat in unitary assembly. The valve plate 78 has an outer rim 84 with a flat lower surface 86 that, when the valve is closed, seats on a flat upper surface 88 of the valve seat 80.

As in the previous embodiment, the outer periphery of the valve plate 78 is spaced by a clearance from the adjacent walls of the passage 76 so that a gas flow passage is defined between the valve plate 78 and the walls of passage 76. In addition, the valve plate 78 includes a group of six annularly spaced openings 90, shown in FIGS. 5, 6 and 9, which extend through the valve plate inwardly of the annular orifice of the valve seat. Thus, when the valve is closed, the lower surface 86 of the valve plate rim 84 seats against upper surface 88 of the valve seat and closes the annular orifice 82 to block exhaust gas flow therethrough. Opening of the valve, to be subsequently described, moves the valve plate upward a short distance or stroke so that gas flow is permitted through the annular orifice 82 fed both from the radially inner side through openings 90 as well from the radially outer side through the peripheral clearance around the valve plate 78. In this case, it is noted that the valve plate 78 is mounted above the valve seat 80 instead of below as in the previously described embodiment.

Housing 74 is secured to the base 72 by a clamp 92 to hold the EGR valve components together. Housing 74 encloses upwardly a pair of vertically spaced magnetic coils 94, 96. The coils are placed to actuate a disk armature 98 through a short vertically reciprocating stroke. The armature is connected by a pintle shaft 100 to the valve plate 78, forming a valve assembly for moving the valve plate downward and upward into valve closed and valve open positions, as previously described.

The dual solenoid coils may be actuated by an electric power source and ECM control with pulse width modulation, as previously mentioned. However, for positively moving the valve between the closed and open positions, the coils are energized alternately so that when coil 94 is energized, coil 96 is de-energized and the valve plate 78 and armature 98 are moved upwardly to the valve open position. At the proper time, depending on the timing and frequency desired, coil 94 is de-energized and coil 96 is energized, thereby drawing the armature 98 and valve plate 78 down to the valve closed position. This cycle is repeated at any desired frequency called for by the ECM of the engine, depending upon the amount of EGR flow desired from full flow to zero flow.

A spacer ring 102 is provided between the coils 94, 96 to establish the desired valve stroke. In this embodiment, a threaded retainer plug 104 is fitted into the upper end of housing 74 to retain the coils in place. A disk spring 106 is provided to load the assemblies and retain the plug in place.

While the invention has been described by reference to certain illustrated embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. An EGR valve for automotive engines, said valve comprising:

a valve body defining inlet and outlet passages and having a valve seat disposed intermediate said passages;

a valve plate in one of said passages and operatively connected with a solenoid actuator for reciprocably moving the valve plate into and away from engagement with the valve seat;

the valve plate and valve seat having respectively engagable plate and seat surfaces, at least one annular orifice extending between said passages through one of said plate and seat and closed by the surface of the other when the plate and seat surfaces are engaged, said other of the plate and seat defining gas flow paths that connect with said annular orifice from both inner and outer sides when said plate and seat surfaces are separated by a predetermined distance, thereby allowing maximum flow between said passages through said annular orifice when opened by a short stroke of the solenoid actuator.

2. An EGR valve as in claim 1 wherein said at least one annular orifice is in the valve seat.

3. An EGR valve as in claim 1 wherein said at least one annular orifice is in the valve plate.

4. An EGR valve as in claim 1 wherein said both said valve seat and said valve plate include a plurality of annular orifices.

5. An EGR valve as in claim 1 wherein said engagable plate and seat surfaces are planar.

6. An EGR valve as in claim 1 wherein said solenoid actuator includes a magnetic armature connected in a reciprocating assembly with said valve plate for reciprocating motion therewith upon operation of said actuator, said assembly having a relatively low mass and a short operating stroke such that flow through the valve may be controlled by cycling of the valve between open and closed positions.

7. An EGR valve as in claim 6 wherein said cycling of the valve is variably controlled by pulse width modulation of the actuating current flow to the solenoid actuator.

8. An EGR valve for automotive engines, said valve comprising:

a valve body defining inlet and outlet passages and having a valve seat disposed intermediate said passages;

a valve plate in one of said passages and operatively connected in an assembly with an armature of a solenoid actuator for reciprocably moving the valve plate into and away from engagement with the valve seat;

the valve plate and valve seat having respectively engagable plate and seat surfaces, at least one annular orifice extending through the valve seat between said passages and closed by the surface of the valve plate when the plate and seat surfaces are engaged, said valve plate defining gas flow paths that connect with said annular orifice from both inner and outer sides when said plate and seat surfaces are separated by a predetermined distance, thereby allowing maximum flow between said passages through said annular orifice when opened by a short stroke of the solenoid actuator.

9. An EGR valve as in claim 8 wherein said valve seat has a plurality of concentric annular orifices and said flow paths defined by said valve plate include at least one annular orifice.

10. An EGR valve as in claim 8 wherein said flow paths defined by said valve plate include a plurality of annularly spaced circular openings in the valve plate.

11. An EGR valve as in claim 8 wherein said flow paths defined by said valve plate include an annular space surrounding the periphery of said valve plate.

12. An EGR valve as in claim 8 wherein said valve plate engages said valve seat on a side of the valve seat facing toward the solenoid actuator and the valve plate is moved toward the actuator to open the valve.

13. An EGR valve as in claim 8 wherein said valve plate engages said valve seat on a side of the valve seat facing away from the solenoid actuator and the valve plate is moved away from the actuator to open the valve.

14. An EGR valve as in claim 8 wherein said actuator includes dual solenoids operable to both close and open the valve by magnetic force.

15. An EGR valve as in claim 8 wherein said actuator includes a single solenoid operable to open the valve and a return spring to close the valve upon deactivation of the solenoid.

\* \* \* \* \*